Jan. 30, 1951  A. D. HATTON  2,539,834
ROTARY TEDDER FOR PEANUT HARVESTERS
Filed Nov. 14, 1949  2 Sheets-Sheet 1

INVENTOR.
A. D. HATTON
BY
A. Yates Dowell
ATTORNEY

Jan. 30, 1951 A. D. HATTON 2,539,834
ROTARY TEDDER FOR PEANUT HARVESTERS
Filed Nov. 14, 1949 2 Sheets-Sheet 2

INVENTOR.
A. D. HATTON
BY
ATTORNEY

Patented Jan. 30, 1951

2,539,834

UNITED STATES PATENT OFFICE 2,539,834

ROTARY TEDDER FOR PEANUT HARVESTERS

A. D. Hatton, Dothan, Ala.

Application November 14, 1949, Serial No. 126,956

4 Claims. (Cl. 56—372)

This invention relates to farming, and more particularly to the gathering of vines on which peanuts are growing, removing the dirt therefrom, and depositing them in a row or on a conveyor or support for subsequent handling.

Peanut diggers and shakers have been widely used heretofore but these have oftentimes been complex in construction and not easily adapted for use with conventional farm machinery such as a tractor. Furthermore, handling of the vines after removal from the ground has often been complicated by the vines being caught in the drive mechanism for the shaker and by the need for replacement of the parts thereof, which has often involved a relatively expensive undertaking.

It is an object of the present invention to provide a peanut shaker which may be easily employed with a conventional tractor and which is adapted to engage the vines on the ground and move them over a plurality of guides as a result of which they are shaken and dirt adhering thereto largely removed and the vines deposited in a row behind the machine or on a conveyor or support provided therefor.

A further object of the invention is the provision of a peanut shaker in which novel means are provided for engaging and guiding the vines as they are shaken in order to remove foreign matter therefrom.

Figure 1:
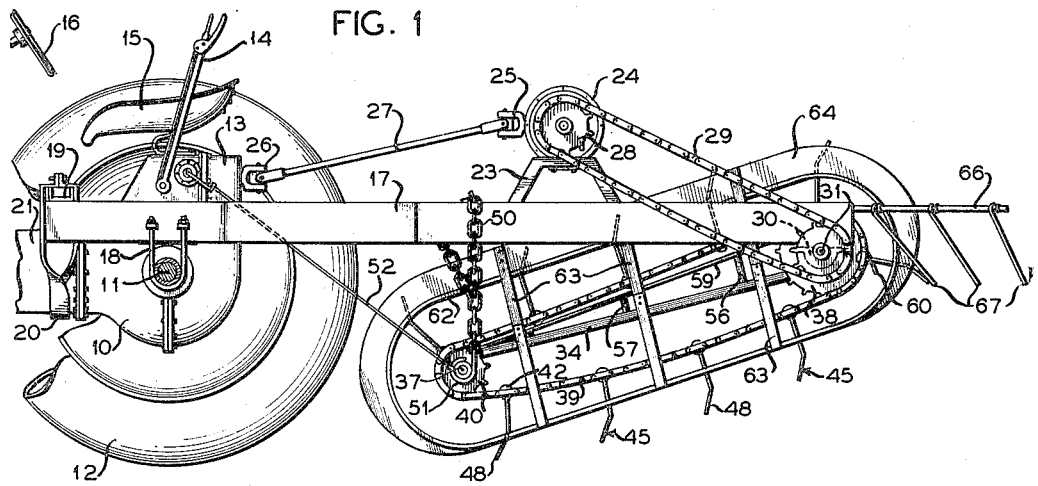
Figure 2:
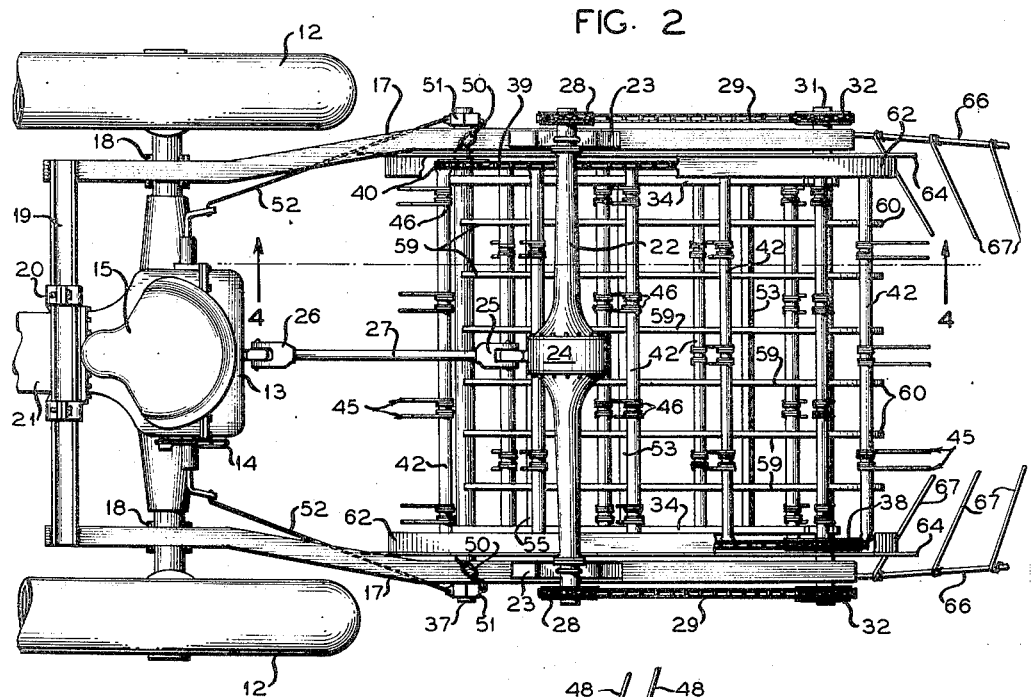
Figure 3:
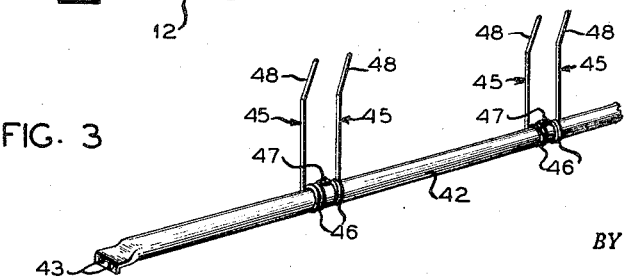
Figure 4:
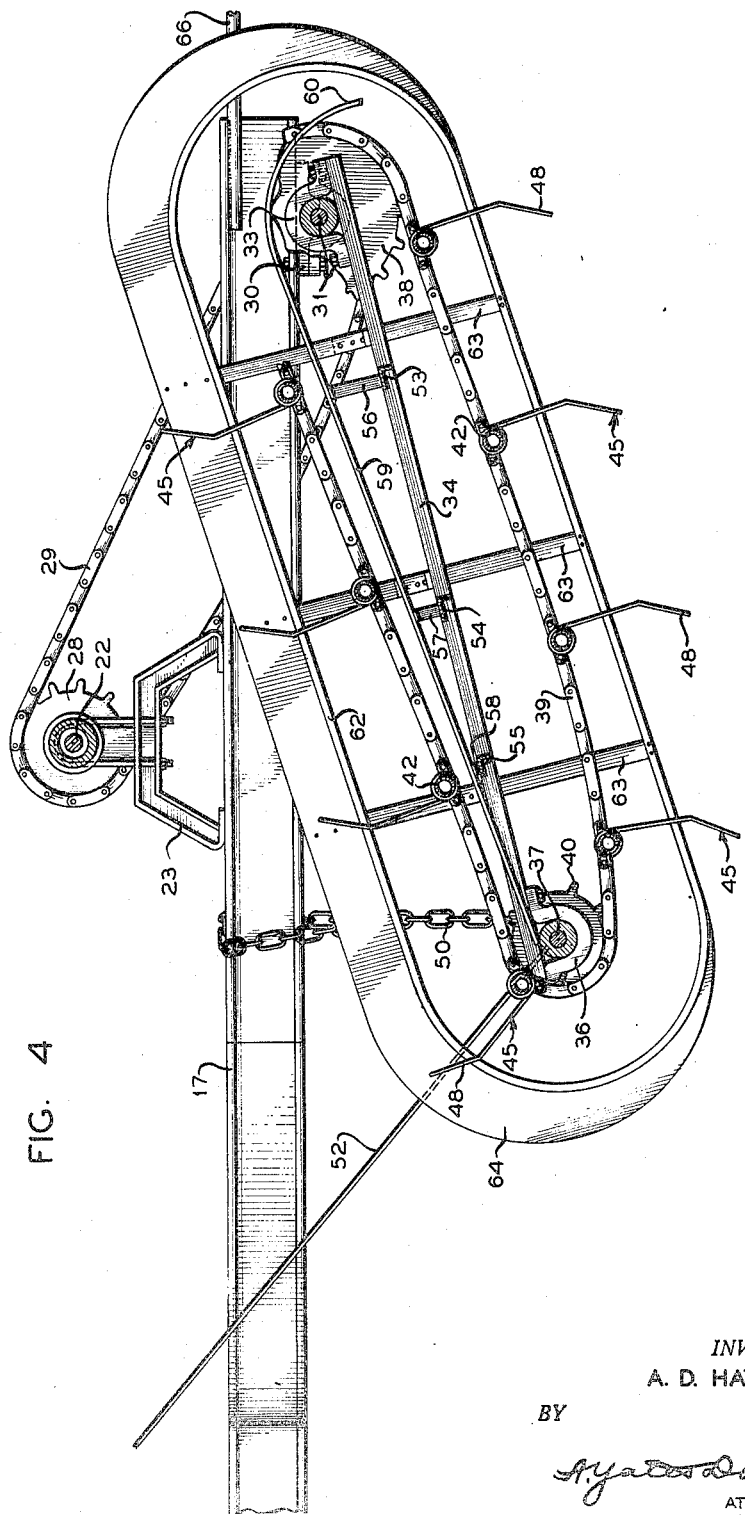

Further objects and advantages of the invention will be apparent from the following description taken in conjunction with the accompanying drawings, wherein:

Fig. 1 is a side elevation of a peanut shaker constructed in accordance with the present invention and illustrating the method by which it is attached to and used with a conventional tractor;

Fig. 2, a top plan view of the device shown in Fig. 1;

Fig. 3, a detail of a portion of one of the lateral bars showing the fingers for engagement with the vines attached thereto; end, Fig. 4, a slightly enlarged section on the line 4—4 of Fig. 2.

Referring to the drawings, a tractor is shown having a rear differential 10 connected to a rear axle 11 of the tractor to which wheels 12 are attached. Positioned above the differential housing is a conventional power take off 13 having a control lever 14. A seat 15 and a steering wheel 16 are provided for use by the operator.

For supporting the peanut shaking mechanism which is an embodiment of the present invention, a pair of box or channel members 17 comprising the side members of a main frame are provided which rest at their forward portion on the housing of the axle 11 of the tractor and are secured thereto by suitable means such as U bolts 18. The U bolts are fastened to the members 17 and extend around the lower portion of the housing of the axle 11. A member 19 extends between the forward extremities of the side members 17 to provide a front for the frame and is connected thereto by welding or the like. A strap iron member 20 has its ends spaced apart substantially the width of drive shaft housing 21 of the tractor and connected to the member 19 with its central portion extending under the axle housing in order to provide additional support for the main frame.

A main drive axle 22 is supported on pillars 23 attached to the members 17 substantially midway between the rear extremity of the members 17 and the axle 11 of the tractor. The axle 22 has a differential joint 24 from which a universal joint 25 extends and is connected to a universal joint 26 extending from the power take-off 13 of the tractor by a rod 27. The axle 22 is provided with sprockets 28 at its extremities around which an endless drive chain 29 is adapted to be driven.

Attached to the under side of the rear extremity of the box member 17 are bearings 30 in which an axle 31 is carried. The axle 31 extends beyond the side members 17 and has sprockets 32 for engagement with the chain 29 in order that power may be transmitted from the power take-off 13 of the tractor through the universal joint 26, rod 27, universal joint 25, differential 24, axle 22, sprocket 28, and drive shaft 29 to the sprocket 32 in order to drive the axle 31.

The bearings 33 supporting the axle 31 are connected to an end of box or channel members 34 comprising the side members of a secondary frame. The members 34 have bearings 36 at their other ends in which an axle 37 is journalled. Mounted between the inside of the members 17 and the bearings 33 are relatively large sprockets 38 to which endless drive chains 39 are connected. The drive chains engage smaller sprockets 40 on the axle 37 just within the side members 17.

Attached to the chains 39 are a plurality of substantially parallel transverse rod members 42, the rod members being provided at spaced intervals along the links of the chain and being attached thereto by suitable connectors passing through apertures 43 in the extremities of the rod members.

The rod members are provided to carry a plurality of fingers 45 which are attached at spaced intervals thereto. The fingers 45 are comprised of flexible wire which is coiled around the members 42 and has its central section or bight 46 engaged with a fastening member 47 attached to the member 42 which provides an abutment for the fingers and locates them on the rod members during assembly. The fingers 45 have offset end portions 48 in order that they may efficiently engage and lift the vines which have been loosened by a conventional plow or the like from the ground. The fingers are spaced substantially the same on alternate rod members, there being two sets of rod members having fingers of like spacing. The fingers of adjacent rod members are staggered relative to each other in order that maximum efficiency of lifting and moving the vines may be obtained.

The secondary frame comprising the channel members 34 and the axles 31 and 37 may be pivoted about the axle 31 in order to adjust the height of the lowest portion of the secondary frame adjacent the axle 37 from the ground and also to permit the secondary frame to ride over obstacles such as rocks, logs, and the like. In order to support the lower portion of the secondary frame in various positions, chains 50 are looped over the channel members 17 above the axle 37 and are secured thereto by suitable means such as a connector 51. In addition, a cable 52 is attached to the axle 37 and extends to a conventional winch on the tractor operable at will by the driver.

Extending between the side members 34 of the secondary frame are a plurality of rails or bars 53, 54, and 55 which are substantially parallel to each other and to the axles 31 and 37 of the frame. The forward rail 53 has upwardly extending struts 56 connected thereto and the rails 54 and 55 have struts 57 and 58 of decreasing length in order to carry a plurality of spaced guide members 59 which extend substantially the length of the secondary frame, over the axles 31 and 37. These guide members have curved end portions 60 for guiding the vines off the device after they have traveled the length thereof. In order to protect the drive chain 39 from interference with vines and the like, a band of sheet material 62 of metal or the like surrounds the chain. It is supported by means of a plurality of spaced connecting members 63 which extend across the band on its outer side which are carried by connections to the side members 34 of the secondary frame.

A vine retaining and guiding side member 64 which extends the length of the secondary frame member and along the upper surface of the guard 62 is attached to the upper and outer portion of the guard in order to retain the vines within the shaking mechanism and to prevent their falling off the sides thereof.

In order to distribute the vines in a row at the rear of the shaker and to further agitate them, rods 66 are provided which are attached to the rear portion of the side members 17. These curve slightly inwardly toward the center of the device and have fingers or arms 67 which curve inwardly and downwardly in order to guide the vines as they move off the rear of the device.

In operation the tractor is attached to the peanut shaker which is the subject of this invention, the drive mechanism for the axles engaged, and the height of the lower portion of the device adjusted by means of the chain and/or the cable to the winch. The tractor is driven along the rows of the peanuts, a plow (not shown) loosening the vines initially from the ground. The vines are picked up by the fingers 45 as the chains 39 are moved around the sprockets by means of the power train; the vines are lifted from the ground by the fingers and are carried rearwardly over the upper part of the device, the members 59 assisting the fingers and the rods 42 in supporting the vines on the upper portion of the device. As the vines are thus moved, the drive chain being loosely adjusted to permit agitation, they are shaken and aired, thus promoting the dislodgment therefrom of particles of foreign matter, including dirt or the like, which may drop down between the fingers and the allied parts of the device onto the ground beneath. The vines are deposited in a windrow at the rear of the shaker being guided by the fingers 67; if preferred a suitable receptacle or other mechanism may follow the peanut shaker to receive the shaken vines.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A shaker for peanut vines comprising a primary frame for attachment to a tractor, the frame having a pair of elongated side members, a first axle supported at the rearward portion of the side members, means connecting the forward portion of the side members to the tractor, a main drive axle supported on the side members between the forward and rearward portions, means for driving the main drive axle from the tractor, a secondary frame comprising substantially parallel side members connected at its rearward portion to the first axle and having a second axle at its forward portion; driving means including chains for driving the first axle from the main axle and for driving the second axle from the first axle; a plurality of spaced substantially parallel bars extending between the drive chains on the secondary frame, and a plurality of spaced fingers connected to said bars; a protecting band extending around the drive chain of the secondary frame, means for supporting the band on the side members of the secondary frame; adjustable means for supporting the forward portion of the secondary frame; rails extending between the side members of the secondary frame, elongated guide members supported on the rails and having curved end portions extending over the first axle for guiding the vines over the shaker and off the end thereof; and guide means supported by the side members of the main frame for receiving the vines from the curved ends of the elongated members and depositing them in a row at the rear of the peanut shaker.

2. A shaker for peanut vines comprising a primary frame for attachment to a tractor, the frame having a pair of elongated side members, a first axle supported at the rearward portion of the side members, means connecting the forward portion of the side members to the tractor to support the primary frame thereon, a main drive axle supported on the side members between the forward and rearward portions, and means for driving the main drive axle from the tractor; a secondary frame comprising substantially parallel side members connected at their rearward portion to the first axle and having a second axle at its forward portion; driving means including chains for driving the first axle from the main drive axle and for driving the second axle from the first axle; a plurality of spaced substantially parallel bars extending between the drive chains and a plurality of spaced fingers connected to said bars; a protecting band extending around each of the last mentioned drive chains, means for supporting the bands on the side members of the secondary frame; side members extending substantially the length of the secondary frame and at substantially right angles to the protecting band and at the upper outside portion thereof for retaining the vines on the shaker; adjustable means for supporting the forward portion of the secondary frame in spaced relation from the ground; rails extending between the side members of the secondary frame, elongated guide members supported on the rails and having curved end portions extending over the first axle for guiding the vines over the picker and off the end thereof; and guide means supported between side members of the main frame for receiving the vines from the curved ends of the elongated members and depositing them in a row at the rear of the peanut shaker.

3. A shaker for peanut vines comprising a primary frame for attachment to a tractor, a first axle supported at the rear of said primary frame, the forward portion of said primary frame being adapted for attachment to a tractor, a main drive axle supported on said primary frame, means for driving the main drive axle from the tractor, a secondary frame comprising substantially parallel side members connected at its rear to the first axle and having a second axle at its forward portion; driving means including chains for driving the first axle from the main axle and for driving the second axle from the first axle; a plurality of spaced substantially parallel bars extending between the drive chains on the secondary frame, and a plurality of spaced fingers connected to said bars; adjustable means for supporting the forward portion of the secondary frame below the primary frame; elongated guide members supported between the side members of the secondary frame and having curved end portions extending over the first axle for guiding the vines over the picker and off the end thereof; and guide means supported by the side members of the main frame for receiving the vines from the curved ends of the elongated members and depositing them in a row at the rear of the peanut shaker.

4. A shaker for peanut vines comprising a primary frame for attachment to a tractor, a first axle supported at the rear of said primary frame, the forward portion of said primary frame being adapted for attachment to a tractor, a main drive axle supported on said primary frame, means for driving the main drive axle from the tractor, a secondary frame comprising substantially parallel side members connected at its rear to the first axle and having a second axle at its forward portion; driving means including chains for driving the first axle from the main axle and for driving the second axle from the first axle; a plurality of spaced substantially parallel bars extending between the drive chains on the secondary frame, and a plurality of spaced fingers connected to said bars; adjustable means for supporting the forward portion of the secondary frame below the primary frame; and means between the side members of the secondary frame for guiding the vines over the shaker and off the end thereof.

A. D. HATTON.

REFERENCES CITED

The following references are of record in the file of this patent:

UNITED STATES PATENTS

| Number | Name | Date |
| --- | --- | --- |
| 2,284,777 | Sund | June 2, 1942 |
| 2,302,881 | Oehler | Nov. 24, 1942 |